United States Patent
Andrecheck et al.

(10) Patent No.: US 9,452,486 B2
(45) Date of Patent: Sep. 27, 2016

(54) AUTOMATIC FLUXING MACHINE

(75) Inventors: Timothy Andrecheck, Chittenango, NY (US); Luis F. Avila, Manlius, NY (US); Jeffrey L. Jones, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 414 days.

(21) Appl. No.: 13/586,429

(22) Filed: Aug. 15, 2012

(65) Prior Publication Data

US 2013/0043297 A1 Feb. 21, 2013

Related U.S. Application Data

(60) Provisional application No. 61/524,062, filed on Aug. 16, 2011.

(51) Int. Cl.
*B23K 1/00* (2006.01)
*B23K 1/20* (2006.01)
*B23K 3/08* (2006.01)

(52) U.S. Cl.
CPC ............ *B23K 1/0012* (2013.01); *B23K 1/203* (2013.01); *B23K 3/082* (2013.01)

(58) Field of Classification Search
None
See application file for complete search history.

(56) References Cited

U.S. PATENT DOCUMENTS

| | | | | |
|---|---|---|---|---|
| 3,709,757 A | * | 1/1973 | Sturley | 156/423 |
| 3,877,518 A | * | 4/1975 | Dreksler | B21D 39/04 |
| | | | | 156/294 |
| 4,407,779 A | * | 10/1983 | Thompson | E03D 9/038 |
| | | | | 222/540 |
| 4,944,858 A | | 7/1990 | Murphy et al. | |
| 5,137,585 A | | 8/1992 | Banas et al. | |
| 5,180,098 A | | 1/1993 | Halstead et al. | |
| 5,211,221 A | * | 5/1993 | Lease | 165/150 |
| 5,950,713 A | | 9/1999 | Kato | |
| 6,325,276 B1 | | 12/2001 | Kawano et al. | |
| 6,367,686 B1 | | 4/2002 | Abriles et al. | |
| 6,395,223 B1 | | 5/2002 | Schuster et al. | |
| 6,615,488 B2 | | 9/2003 | Anders et al. | |
| 6,783,056 B2 | | 8/2004 | Kouno et al. | |
| 7,830,057 B2 | | 11/2010 | Gieras | |
| 2003/0145465 A1 | | 8/2003 | Anders et al. | |
| 2003/0146624 A1 | * | 8/2003 | Gotoh | F16L 23/0283 |
| | | | | 285/334.5 |
| 2008/0099538 A1 | | 5/2008 | DeBiccari et al. | |
| 2009/0011202 A1 | | 1/2009 | Englert et al. | |
| 2010/0052467 A1 | | 3/2010 | Gieras | |
| 2010/0270361 A1 | | 10/2010 | Englert et al. | |
| 2011/0111254 A1 | | 5/2011 | Wittebrood et al. | |
| 2011/0139859 A1 | | 6/2011 | Jaworowski et al. | |
| 2012/0114835 A1 | * | 5/2012 | Belanger | 427/8 |

FOREIGN PATENT DOCUMENTS

| | | |
|---|---|---|
| EP | 1024337 A1 | 8/2000 |
| EP | 1184129 B1 | 10/2006 |
| JP | 07171675 A * | 7/1995 |

* cited by examiner

*Primary Examiner* — Kevin E Yoon
*Assistant Examiner* — Jacky Yuen
(74) *Attorney, Agent, or Firm* — Cantor Colburn LLP

(57) ABSTRACT

An automatic fluxing machine is provided and includes a dispensing section including a surface having through holes formed therein through which flux material is dispensable toward a braze joint and a plugging section disposed below the braze joint to prevent downward flow of dispensed flux material.

6 Claims, 4 Drawing Sheets

AUTOMATIC FLUXING MACHINE

BACKGROUND OF THE INVENTION

Aspects of the present invention are directed to an automatic fluxing machine to apply flux to rings used in brazing round tube plate fin (RTPF) heat exchanger coils in, for example, heating, ventilation, air conditioning and refrigeration products.

Currently, commercially available braze rings for automatic brazing of RTPF heat exchanger coils are made of Al-Zn or Al-Si filler material. Some are solid rings, some others pre-fluxed. Tests have shown that none of them performs as well as an Al-Zn-Si ring when a correct amount of flux is applied to the joint. Manual fluxing can ensure the correct amount of flux is applied. With high through-put assemblies, however, manual fluxing cannot keep up with capacity demands.

BRIEF DESCRIPTION OF THE INVENTION

An automatic fluxing machine is provided and includes a dispensing section including a surface having through holes formed therein through which flux material is dispensable toward a braze joint and a plugging section disposed below the braze joint to prevent downward flow of dispensed flux material.

An automatic fluxing machine for use with an aluminum round tube fin coil with a flange extending above the tube is provided and includes a dispensing section including a surface having through holes formed therein through which flux material is dispensable toward a braze joint at the flange and a plugging section disposed below the braze joint to prevent downward flow of dispensed flux material into the tube.

A method of operating an automatic fluxing machine with an aluminum round tube fin coil with a flange extending above the tube is provided and includes providing the automatic fluxing machine with a dispensing section and a plugging section, inserting the automatic fluxing machine into the round tube fin coil such that the dispensing section is disposed at the flange and the plugging section plugs into the tube, dispensing flux material out of the dispensing section into the flange and preventing flow of the flux material into the tube and removing the automatic fluxing machine from the round tube fin coil.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In accordance with aspects of the invention, an automated flux application method and apparatus for return bends and/or hairpins is provided as an automatic fluxing machine. The automatic fluxing machine controls amount of flux to be dispensed to a given braze joint in a repeatable, consistent way. The automatic fluxing machine is therefore capable of providing for high production rates.

Figure 1:
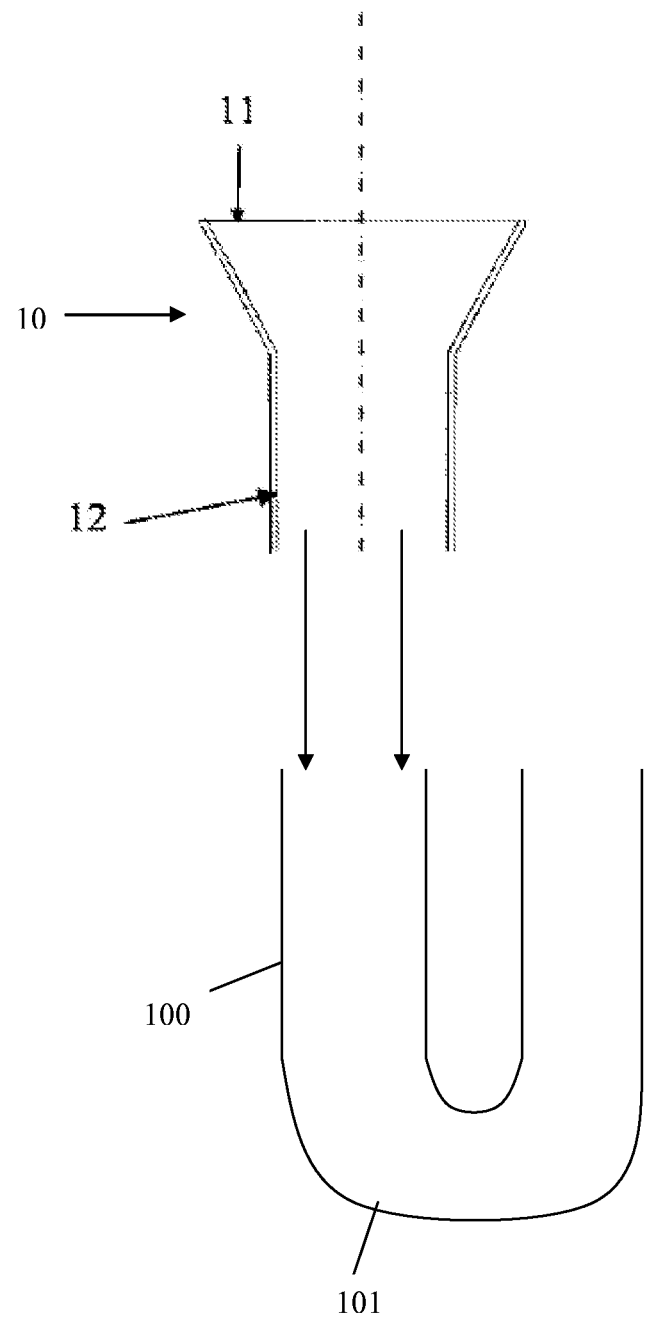
FIG. 1 is a schematic illustration of a tube and a flange of an automatic fluxing machine.

With reference to FIG. 1, an automatic fluxing machine 10 for use with an aluminum round tube fin coil has a flange 11 extending above the tube 12. The machine 10 could be employed at the hairpin of the round tube fin coil 100 or the return bend 101 with similar constructions in each. For the sake of clarity and brevity, only the hairpin application will be discussed herein as a non-limiting example.

As shown in FIG. 1, the tube 12 extends substantially vertically and has a tubular shape. The flange 11 is disposed above the tube 12 and has a tapered shape from a wide upper end to a narrow lower end where the flange 11 and the tube 12 meet.

Figure 2:
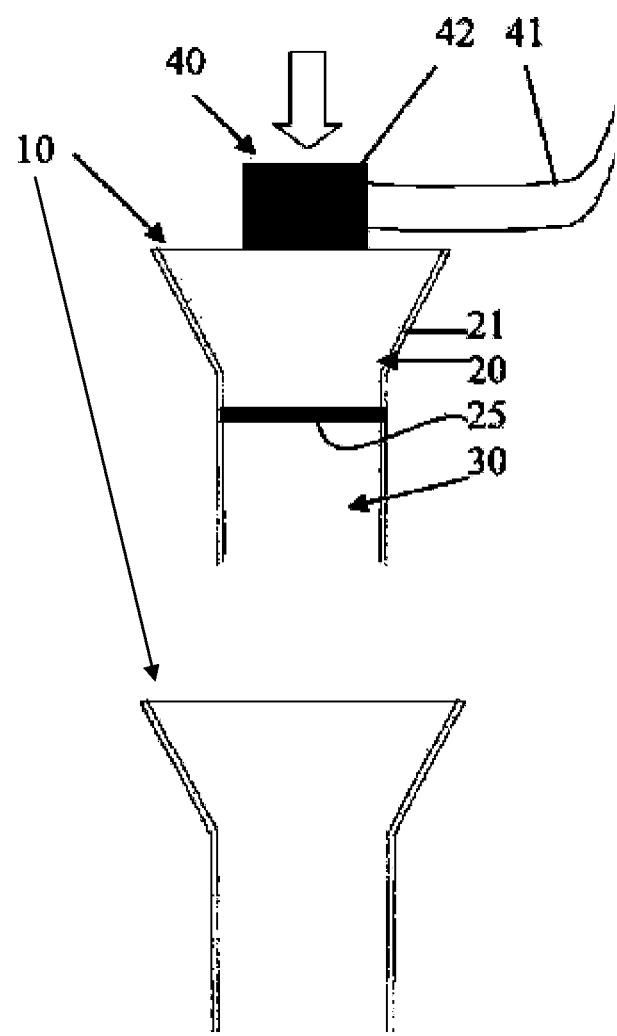
FIG. 2 is a schematic illustration of a dispensing section and a plugging section being drawn toward the tube and the flange.
Figure 3:
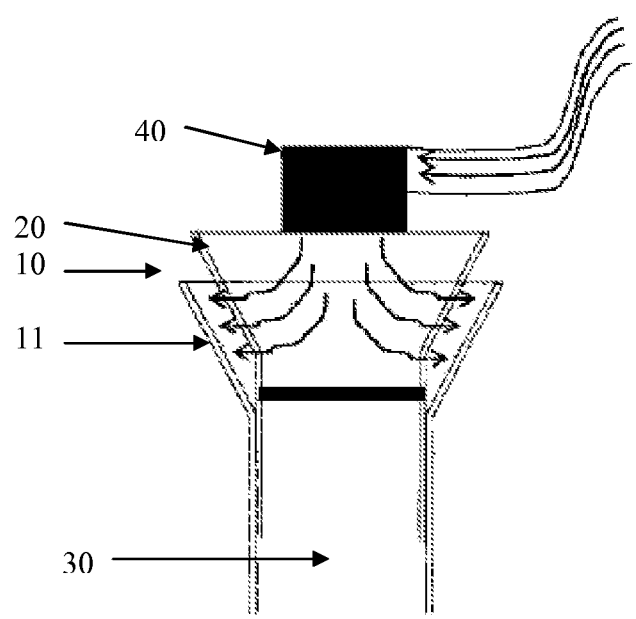
FIG. 3 is a schematic illustration of the dispensing section and the plugging section being inserted in the tube and the flange.
Figure 4:
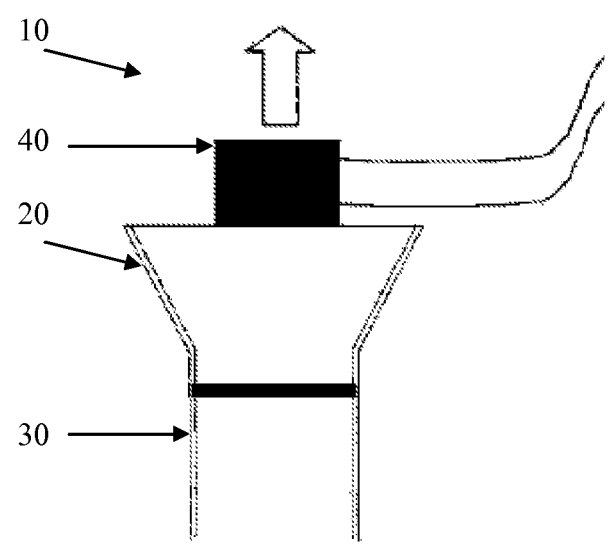
FIG. 4 is a schematic illustration of the dispensing section and the plugging section being removed from the tube and the flange.
Figure 4:
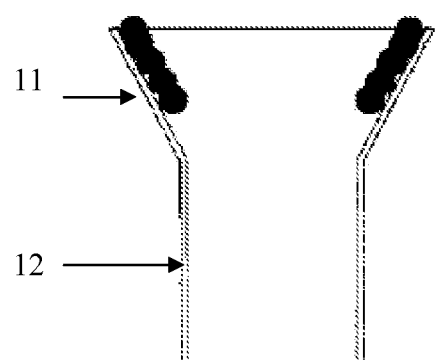

With reference to FIGS. 2-4, the machine 10 includes a dispensing section 20, a plugging section 30 and a supplying unit 40. The dispensing section 20 includes a surface 21 having through holes formed therein through which flux material is dispensable toward a braze joint to be defined at the flange 11. The plugging section 30 is disposed below the braze joint at the tube 12 and is configured to prevent a downward flow of dispensed flux material into the tube 12 as explained below. The supplying unit 40 includes a flux conduit 41 to supply the flux material to the dispensing section 20 and a couple 42. The couple is operably disposed between the flux conduit 41 and the dispensing section 20 and serves to couple the flux conduit 41 and the dispensing section 20 with one another.

As shown in FIG. 2, the surface 21 of the dispensing section 20 has a frusto-conical shape that corresponds to the shape of the flange 11. The plugging section 30 has a tubular shape that corresponds to the shape of the tube 12. In particular, an outer diameter of the plugging section 30 is similar to the inner diameter of the tube 12 such that the plugging section 30 fits tightly within the tube 12 and the flow of the flux material into the tube 12 is substantially prevented.

The dispensing section 20 and the plugging section 30 are coupled to one another at mutually complementary ends, which have similar diameters. In addition, a stop gap 25 may be disposed in the plugging section 30 at the complementary end thereof. Thus, flux material supplied to the dispensing section can be prevented from leaking out of the dispensing section 20 and into the tube 12 by way of the plugging section 30, which may be, otherwise, empty or hollow.

With particular reference to FIGS. 3 and 4, with the construction described above, the flux material is laterally dispensable from the dispensing section 20. In an embodiment, based on the size of the through holes and the type of the flux material, the flux material may be dispensed in bead form as shown in FIG. 4.

A method of operating the machine 10 is shown in the sequence of FIGS. 1-4. The method includes providing the machine 10 with a dispensing section 20 and plugging section 30 as described above, inserting the machine 10 into the round tube fin coil such that the dispensing section 20 is disposed at the flange 11 and the plugging section 30 plugs into the tube 12, dispensing flux material out of the dispensing section 20 into the flange 11 and preventing flow of the flux material into the tube 12 and removing the machine 10. As shown in FIGS. 3 and 4 and as described above, the dispensing includes dispensing the flux material evenly and completely around the flange 11 and, in some cases, dispensing the flux material in bead form.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An automatic fluxing machine for use with a joint including tubular and frusto-conical parts, the automatic fluxing machine comprising:
    a frusto-conical dispenser having through-holes and an upper edge;
    a tubular plug, which extends tightly into the tubular part such that an upper portion, a surface of the frusto-conical dispenser and the frusto-conical part define an annulus into which flux material is dispensable through the through-holes and which comprises a first side extending along the surface of the frusto-conical dispenser, a second side extending along the frusto-conical part and a third side extending along the upper portion,
    the tubular plug comprising a stopper disposed therein to prevent flux material flow through the tubular plug and into the tubular part; and
    a supplying unit including a conduit, which is coupled to the upper edge of the frusto-conical dispenser, to supply the flux material to the frusto-conical dispenser.

2. The automatic fluxing machine according to claim 1, wherein a tight fitting between the tubular plug and part prevents flux material flow into the tubular part.

3. The automatic fluxing machine according to claim 1, wherein the tubular plug is removable from the tubular part with the flux material dispensed into the annulus.

4. The automatic fluxing machine according to claim 1, wherein the frusto-conical dispenser tapers outwardly from the tubular part and terminates at the upper edge.

5. The automatic fluxing machine according to claim 1, wherein the tubular plug extends into the tubular part with a uniform diameter and is hollow but for the stopper.

6. A joint forming system, comprising:
    a tubular part;
    a frusto-conical part extending upwardly from the tubular part; and
    an automatic fluxing machine configured to form a braze joint along an interior surface of the frusto-conical part, the automatic fluxing machine comprising:
    a frusto-conical dispenser having through-holes and an upper edge;
    a tubular plug extendable tightly into the tubular part such that an upper portion, a surface of the frusto-conical dispenser and the frusto-conical part define an annulus into which flux material is dispensable through the through-holes and which comprises a first side extending along the surface of the frusto-conical dispenser, a second side extending along the frusto-conical part and a third side extending along the upper portion,
    the tubular plug comprising a stopper disposed therein to prevent flux material flow through the tubular plug and into the tubular part; and
    a supplying unit including a conduit, which is coupled to the upper edge of the frusto-conical dispenser, to supply the flux material to the frusto-conical dispenser.

* * * * *